United States Patent [19]

Heymanns

[11] 4,133,089
[45] Jan. 9, 1979

[54] COMBINED PRECISION BORING AND BURNISHING TOOL

[75] Inventor: Lothar Heymanns, Mönchen-Gladbach, Fed. Rep. of Germany

[73] Assignee: Wilhelm Hegenscheidt GmbH, Erkelenz, Fed. Rep. of Germany

[21] Appl. No.: 837,690

[22] Filed: Nov. 16, 1977

[51] Int. Cl.$^2$ .................... B24B 39/00; B23B 51/06
[52] U.S. Cl. .................................. 29/90 R; 408/22; 408/56
[58] Field of Search ............. 408/22, 56, 57, 118, 408/143; 29/90 R, 26

[56] References Cited
U.S. PATENT DOCUMENTS

| | | | |
|---|---|---|---|
| 3,795,957 | 3/1974 | Steusloff | 408/22 |
| 3,980,442 | 9/1976 | Rickeles | 29/90 R |
| 4,054,976 | 10/1977 | Ewald | 29/90 R |

*Primary Examiner*—Harrison L. Hinson
*Attorney, Agent, or Firm*—Michael J. Striker

[57] ABSTRACT

A combined tool for precision boring and burnishing the internal surfaces of workpieces comprises a bore head arrangement, a burnishing head arrangement rearwardly of the bore head arrangement and a feed tube arrangement connected to the burnishing head arrangement for axially advancing the latter and the bore head arrangement into a rotating workpiece for finishing the internal surface thereof while a stream of flushing oil under pressure is fed about the tool for removing chips shaved off by the bore head arrangement. The bore head arrangement is provided with a plurality of circumferentially displaced oil pockets which are supplied with oil under pressure for hydrostatically supporting and guiding the bore head arrangement during its advance. The three mentioned arrangements are connected to each other for simultaneous advance into the workpiece while being prevented from rotating relative to each other and the connectors preferably include a coupling arrangement between at least two of the three first-mentioned arrangements for transmitting a moment from one to the other of the two arrangements by permitting limit deviation of the axes thereof.

12 Claims, 4 Drawing Figures

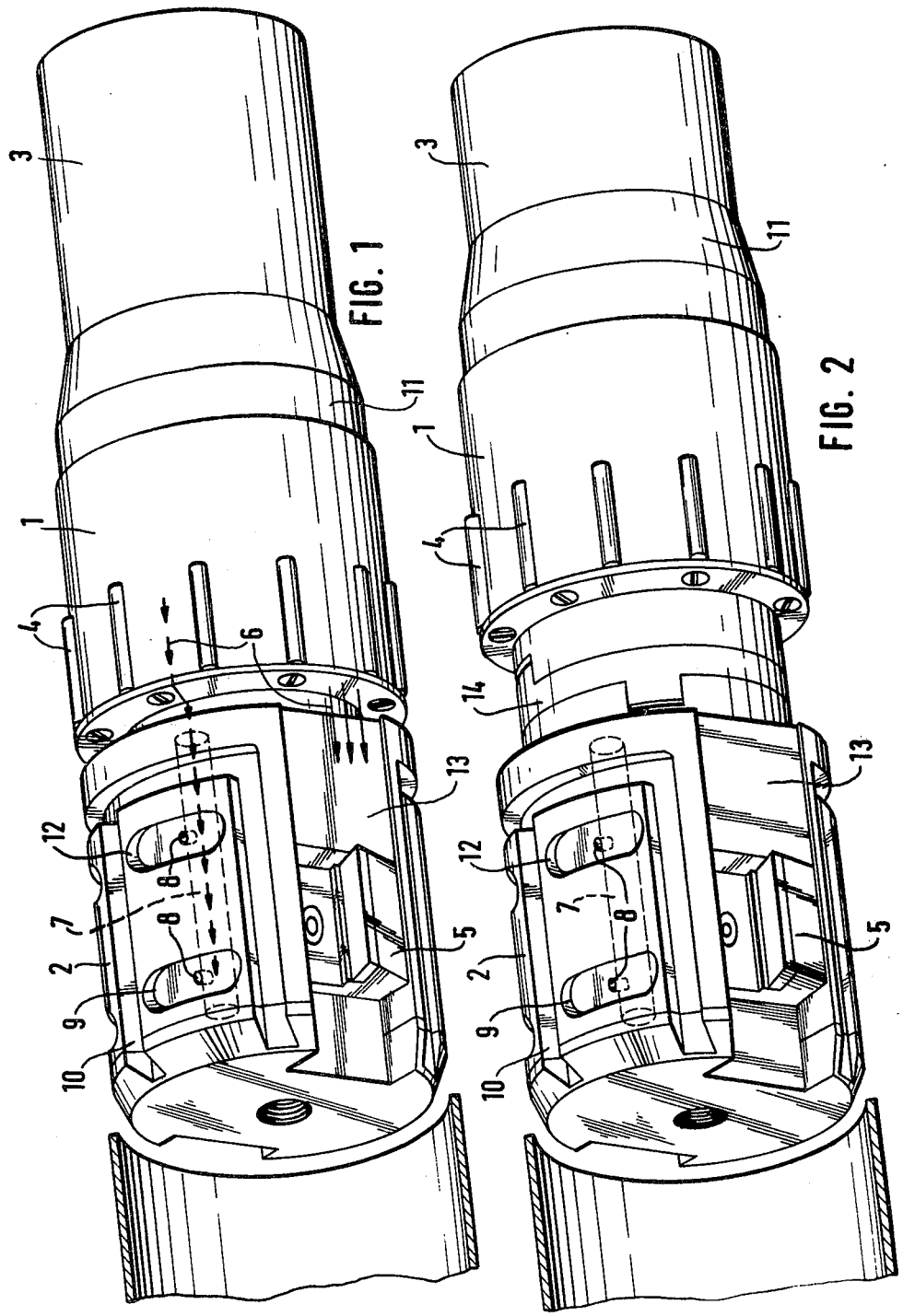

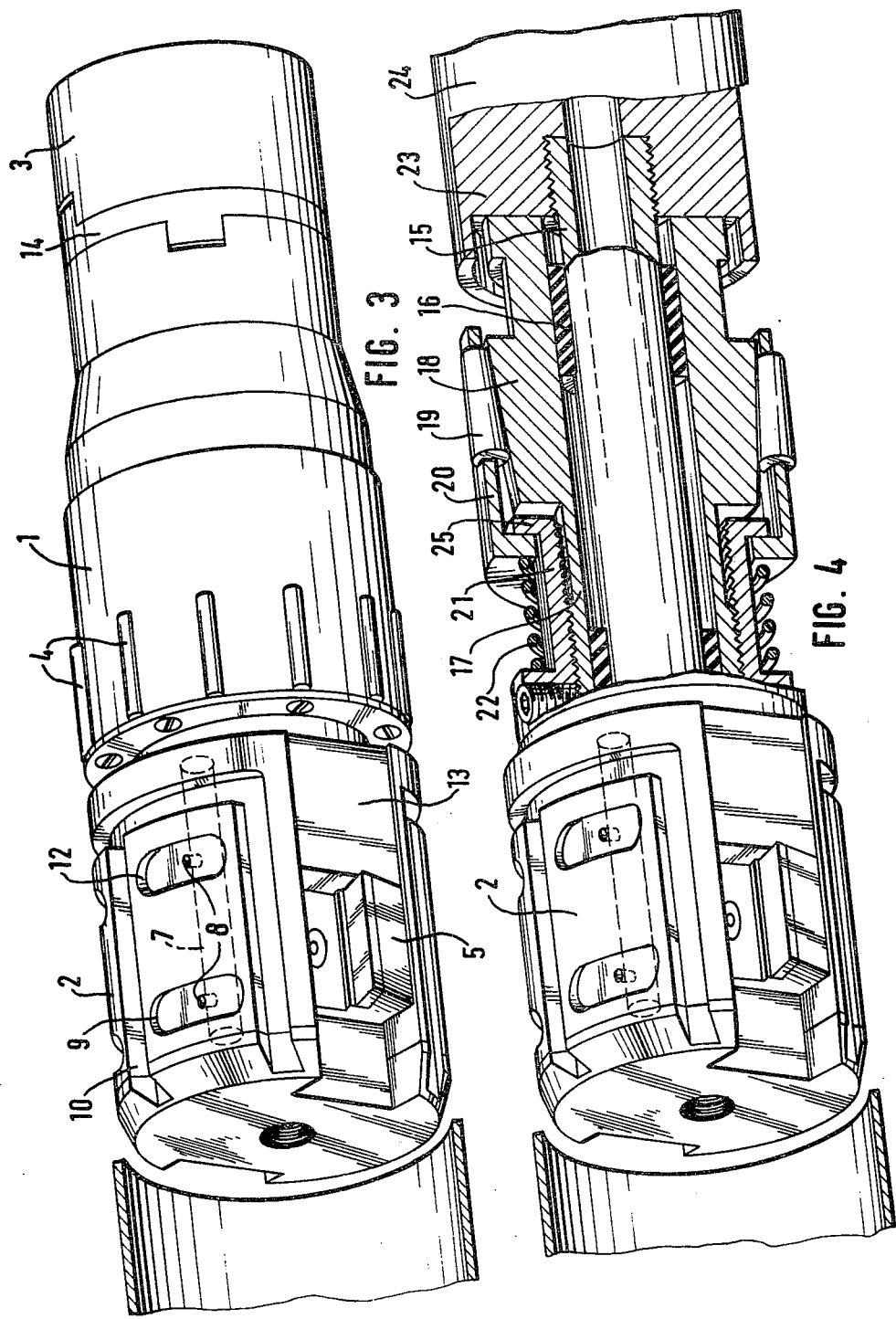

COMBINED PRECISION BORING AND BURNISHING TOOL

BACKGROUND OF THE INVENTION

The present invention relates to a combined tool for precision boring and burnishing the internal surfaces of workpieces.

Tools of this type are well known in the art and for instance disclosed in the German Offenlegungsschriften Nos. OS-2346729, OS-2362788, OS-2209234 and OS-2223696.

These known tools all have a considerable common disadvantage, namely a considerable wear of their guide bars which is due to the sagging of the feed tube and the resulting clamping of the guide bars in the bore of the workpiece. The wear of the guide bars is further increased due to the fact that during the boring the center of the machine usually does not coincide with the center of the workpiece. The clamping of the guide bars leads also often to a vibration of the bore and burnishing tool and therewith to a reduction of the surface quality, as well as to a reduction of the usual life of the tool.

SUMMARY OF THE INVENTION

It is an object of the present invention to provide a combined tool for precision boring and burnishing of the internal surface of workpieces, which avoids the above-mentioned disadvantages of such tools known in the art.

With these and other objects in view, which will become apparent as the description proceeds, the combined tool according to the present invention for precision boring and burnishing workpieces mainly comprises bore head means, burnishing head means arranged rearwardly of the bore head means and adapted to be advanced in axial direction with the latter into a workpiece for finishing the internal surface of the same while a stream of flushing oil under pressure is fed preferably in the direction of advancement of the tool about the same for removing chips shaved off by the bore head means, and means for hydrostatically guiding the bore head means including a plurality of circumferentially displaced oil pockets and means for supply oil under pressure to the pockets including oil feed bores and throttle bores between the feed bores and the oil pockets.

Preferably, at least two oil pockets are provided at each quadrant of the circumference of the bore head means and the pockets in each quadrant are displaced from each other in the axial direction of the bore head means. In this way a perfect hydrostatic guiding of the bore head means even at the start of the machining operation is assured.

According to a further advantageous development of the invention it is suggested that the oil pockets extend in the circumferential direction of the bore head means. In this way difficulties are avoided which could result from the diameter difference between the original bore of the workpiece and the machined bore, since in the thus-resulting different oil gap the position and the size of the guide forces of the hydrostatic guide would be unpredictable.

According to a further advantageous feature of the present invention the oil pockets in each quadrant are separated from the oil pockets in the neighboring quadrant by pressure releasing grooves. This will assure, on the one hand, that the flushing oil passing outwardly in the region of the oil pockets may flow through the aforementioned grooves substantially pressure free, or at least with a lower pressure than the pressure at which the flushing oil in the oil pockets may flow off, and, on the other hand, that a difference in the pressure in the oil pockets and therewith an unsuitable hydrostatic guiding of the boring head is avoided.

According to a further advantageous feature of the present invention it is suggested that the feed bores for the oil pockets communicate with the stream of flushing oil under pressure so that the flushing oil serves at the same time as the pressure medium for the hydrostatic guiding of the bore head means. In this way separate means for furnishing oil under pressure to the oil pockets, which basically would be possible, is avoided.

The arrangement further includes feed tube means rearwardly of the burnishing head means for feeding the bore head means and the burnishing head means into a workpiece to be machined, and connecting means connecting the three first-mentioned means for preventing rotation of the same relative to each other, the connecting means including coupling means for transmitting a moment from one to the adjacent of the three first-mentioned means by permitting limited deviation of the axes of the two adjacent means from each other.

These coupling means may be arranged between the bore head means and the burnishing head means and they preferably comprise an Oldham coupling.

On the other hand, the coupling means may be arranged between the feed tube means and the bore head means and this coupling means may likewise comprise an Oldham coupling.

Such an Oldham coupling is simple in its construction and will positively transmit a moment between the connecting elements by permitting a parallel displacement of the axes of the adjacent means, and in addition also a limited angular displacement of the above-mentioned axes.

The connecting means may also comprise a shaft rigidly connecting the bore head means and the feed tube means along a common axis, and the coupling means may comprise resilient means mounting the bore head means coaxial with the axis of the shaft by permitting radial movement of the bore head means relative to the shaft axis. This arrangement is especially advantageous when the chips removed by the bore head means cannot be transported by the flushing oil in the direction of advance of the combined tool but are flushed in a direction opposite to the advancing direction through the hollow tool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a first embodiment of a combined boring and burnishing tool with a hydrostatically guided bore head according to the present invention;

FIG. 2 is a perspective view of a combined boring and burnishing tool with a hydrostatically guided bore head and an Oldham coupling between the bore head and the burnishing head of the tool;

FIG. 3 is a perspective view of a combined boring and burnishing tool wth a hydrostatically guided bore head and showing also an Oldham coupling between the burnishing head and the feed tube connected thereto; and FIG. 4 is a perspective view of a combined boring and burnishing tool with a hydrostatically guided bore head and a burnishing head radially movably connected thereto.

DESCRIPTION OF THE PREFERRED EMBODIMENTS

Referring now to the drawings, and more specifically to FIG. 1 of the same, it will be seen that the combined tool according to the present invention for precision boring and burnishing of tubular workpieces comprises a burnishing head 1 of known construction, carrying a plurality of circumferentially displaced smoothing or burnishing rolls 4 by means of which the inner surface of a correspondingly premachined workpiece W is smoothly rolled. A boring head 2 is coupled to the forward end shown in the drawing at the left end of the burnishing head 2. The bore head has the task to machine the inner surface of the workpiece W to the necessary diameter for the following burnishing operation.

In principle this boring operation can be carried out with any known boring tool. According to the construction shown in FIG. 1 the boring operation is carried out by a peeling knife 5 which is guided for movement in direction normal to the axis of the bore head 2 in a radial cutout of the latter and of which only the front portion is visible in FIG. 1. The peripheral surface of the bore head 2 is divided by the horizontally extending peeling knife 5 into two halves and by a vertical plane into four quadrants in each of which two oil pockets 9 and 12 are arranged axially displaced from each other so that a total of eight pockets is arranged on the circumference of the boring head 2. Each of the pockets 9 and 12 extends in circumferential direction of the bore head. The oil pockets 9 and 12 in each quadrant are connected by throttle bores 8 to a common feed bore 7 extending in axial direction of the bore head 2.

The outer diameter of the bore head 2 is only a few tenths of a millimeter smaller than the diameter of the non-machined bore of the tubular workpiece W. If in a special machining operation the diameter difference before and after the peeling operation with the bore head 2 should be too great, then it is advantageous to increase the diameter in the region in which the oil pockets 12 are located correspondingly, so that the gap between the inner surface of the workpiece and the outer surface of the bore head is held within suitable and known limits required for the proper hydrostatic guiding of the bore head. During the machining of the workpiece the combined tool is usually flowed about by a stream of flushing oil under pressure. Due to the fact that the outer diameter of the bore head 2 is only a few tenths of a millimeter smaller than the bore in the workpiece, this flushing oil stream under pressure is dammed up by the bore head and guided through a pair of opposite channels 13 extending in longitudinal direction of the bore head 2, with great speed past the opposite ends of the peeling knife 5. The oil dammed in the region of the burnishing head 1 rearwardly of the bore head 2 enters also into the feed bore 7 which extends axially through each of the aforementioned four quadrants, and this oil then flows under pressure through the throttle bores 8 into the respective oil pockets 9 and 12 to thus guide and support in the manner of hydrostatic bearings the bore head 2 on the inner surface of the workpiece W. The oil which passes from the oil pockets 9 and 12 into the clearance gap between the outer peripheral surface of the bore head 2 and the inner surface of the workpiece, is discharged released of pressure through oil releasing grooves 10 extending in axial direction through the bore head 2 between the oil pockets in each quadrant. The direction of flow of the flushing oil is indicated by the arrow 6.

A connecting member in form of an elongated feed tube 3 only partially shown in FIG. 1 is connected by means 11 of known construction to the rear end shown in FIG. 1 as the right end of the burnishing head, for moving the latter and the bore head 2 connected thereto in axial direction into the workpiece W while the latter is rotated about its axis.

The means for rotating the workpiece W about its axis, the means for advancing the feed tube 3 in axial direction and the means for feeding the flushing oil in the direction of the arrow 6 are not shown in the drawing and such means are well known in the art and are, for instance, schematically illustrated in the copending application Ser. No. 678,716 filed Apr. 20, 1976.

The hydrostatic guiding of the bore head 2 may not only advantageously be used in a combined tool for precision boring and burnishing of workpieces, but may also be advantageously used with a boring or peeling head.

The combined precision boring and burnishing tool shown in FIG. 2 likewise comprises a bore head 2 constructed in the same manner as described above in connection with FIG. 1, a burnishing head 1 arranged rearwardly of the bore head 2 and likewise constructed in the manner as described above in connection with FIG. 1. To the rear of the right end as shown in the drawing, a feed tube 3 is connected by connecting elements 11. The essential difference between the embodiment shown in FIG. 2 and that shown in FIG. 1 is that the front end, shown in the drawing as the left end of the burnishing head 1, is connected to the adjacent rear end of the bore head 2 by means of a coupling for transmitting a moment between the two heads, which coupling is constructed to permit a limited deviation of the axes of the two adjacent heads from each other, i.e. a limited parallel shifting of the two axes relative to each other and/or a limited inclination of these axes relative to each other. The coupling 14 is illustrated in FIG. 2 as an Oldham coupling.

The embodiment shown in FIG. 3 differs from the embodiment shown in FIG. 2 only in that the bore head 2 is fixedly connected with the burnishing head 1 aligned along a common axis in the same manner as shown in FIG. 1 while an Oldham coupling 14 is arranged between the rear end of the burnishing head 1 and the front end of the feed tube 3. This will assure that even in the event of relatively large sagging of the feed tube 3, the tear-shaped impressions produced by the burnishing rolls 4 on the burnishing head will not be changed in an undue manner. By this construction it is also possible to compensate for any center deviations of the tool center and the workpiece center.

It is also possible to connect the bore head 2 and the burnishing head 1 by a coupling 14 as shown in FIG. 2 and in addition thereto provide a coupling 14 between the burnishing head 1 and the feed tube 3. Such an arrangement will always be advantageous when not only center deviations and sagging of the feed tube 3 have to be compensated for, but when also special cutting operations are present due to which the proper operation of the burnishing head 1 would be influenced by the operation of the bore head 2. The coupling 14 in a tool according to FIG. 2 will also assure that any errors in the coaxial alignment of the bore head 2 and the burnishing head 1 which are due to finishing tolerances, are properly compensated. FIG. 4 shows a further construction for solving this problem. The modification shown in FIG. 4 is provided at its front end with a bore head 2 constructed in the same manner as described before and this bore head 2 is rigidly connected by means of a coaxial shaft 15 and a connecting part 23 with the feed tube 24. In order to permit greater finishing tolerances on the burnishing head without imparting detrimental effects to the hydrostatically guided bore head 2, the burnishing head has to be radially movable with regard to the common axis of the bore head 2 and the feed tube 24. For this purpose a member 17 is arranged with clearance about the shaft 15 and mounted thereon by resilient centralizing elements 16, for instance, rubber rings fixedly connected by, e.g., cementing to the outer surface of the shaft 15 and the inner surface of the member 17. The member 17 is integrally formed with a supporting cone 18 the outer surface of which is engaged by the burnishing rolls 19. The member 17 also carries an adjusting sleeve 21 connected thereto by a screw thread so as to be axially movable with respect thereto, and in a known manner the adjusting sleeve 21 is connected by means of a shoulder 25 and a coil spring 22 with the cage 20 carrying the burnishing rolls 19 so that during axial movement of the adjusting sleeve 21 relative to the member 17 the acting diameter of the burnishing rolls 19 may be adjusted by moving the latter along the outer surface of the cone 18.

The embodiment shown in FIG. 4 with the hydrostatically guided bore head and the radially movable burnishing head avoids in advantageous manner the wear and adjusting problems of the guide bars according to the prior art, as well as the detrimental action of a feed tube sag. In addition, any eventually occurring vibrations of the bore head are not transmitted to the burnishing head. Of course it is also possible in the construction as shown in FIG. 4 to arrange between the rear end of the burnishing head and the front end of the feed tube connected thereto a suitable coupling, for instance, an Oldham coupling as shown in FIG. 3. In this way it is possible to compensate for a rather large sagging of the feed tube and rather large deviations between the centers of the tool and the workpiece.

It will be understood that each of the elements described above, or two or more together, may also find a useful application in other types of combined precision boring and burnishing tools differing from the types described above.

While the invention has been illustrated and described as embodied in a combined tool for precision boring and burnishing the inner surfaces of workpieces, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A combined tool for precision boring and burnishing the inner surfaces of workpieces comprising, in combination, bore head means; burnishing means arranged rearwardly of said bore head means and adapted to be advanced in axial direction into a workpiece for finishing the internal surface of the latter while a stream of flushing oil under pressure is fed preferably in the direction of advancement of the tool about the same for removing chips shaved off by the bore head means; and means for hydraulically guiding said bore head means, including a plurality of circumferentially displaced oil pockets and means for supplying oil under pressure to said pockets, including oil feed bores and throttle bores between said feed bores and said oil pockets.

2. A combined tool as defined in claim 1, wherein at least two oil pockets are provided at each quadrant of the circumference of the bore head means, the pockets in each quadrant being displaced from each other in the axial direction of the bore head means.

3. A combined tool as defined in claim 2, wherein each oil pocket extends in the circumferential direction of the bore head means.

4. A combined tool as defined in claim 3, and including a plurality of oil releasing grooves respectively extending in axial direction of said bore head means between the oil pockets in one quadrant and the oil pockets in the quadrant adjacent thereto.

5. A combined tool as defined in claim 1, wherein said oil feed bores communicate at one end with a stream of said flushing oil passed about said tool so that said flushing oil serves at the same time as pressure medium for the hydrostatic guiding of said bore head means.

6. A combined tool as defined in claim 1, and including feed tube means rearwardly of said burnishing head means for feeding said bore head means and said burnishing head means into a workpiece to be machined; and connecting means connecting said three first-mentioned means for preventing rotation of the same relative to each other, said connecting means including coupling means for transmitting a moment from one to the adjacent of said three first-mentioned means for permitting limited deviation of the axes of said two adjacent means from each other.

7. A combined tool as defined in claim 6, wherein said coupling means is arranged between said bore head means and said burnishing head means.

8. A combined tool as defined in claim 6, wherein said coupling means comprises an Oldham coupling.

9. A combined tool as defined in claim 6, wherein said coupling means is arranged between said feed tube means and said bore head means.

10. A combined tool as defined in claim 9, wherein said coupling means comprises an Oldham coupling.

11. A combined tool as defined in claim 6, wherein said connecting means comprises a shaft rigidly connecting said bore head means and said feed tube means along a common axis, and said coupling means comprises resilient means mounting said bore head means coaxial with said axis of said shaft by permitting radial movement of said bore head means relative to said shaft axis.

12. A combined tool as defined in claim 11, wherin said bore head means has an inner surface surrounding said shaft with clearance, and wherein said resilient means comprises a plurality of axially displaced rubber rings in said clearance between the inner surface of said bore head means and the outer surface of said shaft and fixedly connected to said surfaces.

* * * * *